US012223974B2

(12) United States Patent
Müller et al.

(10) Patent No.: US 12,223,974 B2
(45) Date of Patent: Feb. 11, 2025

(54) METHOD, HEARING SYSTEM, AND COMPUTER PROGRAM FOR IMPROVING A LISTENING EXPERIENCE OF A USER WEARING A HEARING DEVICE

(71) Applicant: SONOVA AG, Staefa (CH)

(72) Inventors: Stephan Müller, Staefa (CH); Stefan Klockgether, Hombrechtikon (CH)

( * ) Notice: Subject to any disclaimer, the term of this patent is extended or adjusted under 35 U.S.C. 154(b) by 236 days.

(21) Appl. No.: 17/886,083

(22) Filed: Aug. 11, 2022

(65) Prior Publication Data

US 2023/0076871 A1 Mar. 9, 2023

(30) Foreign Application Priority Data

Sep. 9, 2021 (EP) .................................... 21195745

(51) Int. Cl.
*G10L 21/02* (2013.01)
*G10L 25/51* (2013.01)

(52) U.S. Cl.
CPC .............. *G10L 21/02* (2013.01); *G10L 25/51* (2013.01)

(58) Field of Classification Search
CPC ....... G10L 21/02; G10L 25/51; H04R 1/1083; H04R 25/505; H04R 25/507; H04R 25/554; H04R 25/70
See application file for complete search history.

(56) References Cited

U.S. PATENT DOCUMENTS

| | | | | |
|---|---|---|---|---|
| 7,016,504 B1 * | 3/2006 | Shennib | ............... | H04R 25/558 381/60 |
| 11,995,376 B2 * | 5/2024 | Hartung | .................. | H04S 7/305 |
| 2009/0248403 A1 * | 10/2009 | Kinoshita | ............... | H04S 7/305 704/219 |
| 2012/0063610 A1 * | 3/2012 | Kaulberg | ............. | H04R 25/407 381/71.1 |

(Continued)

FOREIGN PATENT DOCUMENTS

| | | |
|---|---|---|
| EP | 2835986 A1 | 2/2015 |
| WO | 2016049403 A1 | 3/2016 |

OTHER PUBLICATIONS

"Extended European Search Report received in EP Application No. 21195745.1 on Mar. 4, 2022".

*Primary Examiner* — Fariba Sirjani
(74) *Attorney, Agent, or Firm* — ALG Intellectual Property, LLC

(57) ABSTRACT

A method for improving a listening experience of a user wearing a hearing device of a hearing system includes providing an audio sample based on a generated audio signal; determining, whether the audio sample comprises audio content matching a predetermined sound pattern indicative of an original version of the audio content; comparing the audio sample with the original version of the audio content, if the audio sample is determined to comprise the audio content matching the predetermined sound pattern; determining at least one acoustic property of current surroundings of the user depending on the comparison; deter- (Continued)

mining at least one parameter for modifying the audio signal depending on the determined acoustic property; modifying the audio signal generated by the sound input component by the sound processing module, in accordance with the determined parameter; and outputting the modified audio signal to the user.

13 Claims, 2 Drawing Sheets

(56) References Cited

U.S. PATENT DOCUMENTS

| | | | | |
|---|---|---|---|---|
| 2016/0111111 | A1* | 4/2016 | Levitt | G10L 21/013<br>704/226 |
| 2016/0269849 | A1* | 9/2016 | Riggs | H04S 7/304 |
| 2017/0303053 | A1* | 10/2017 | Falch | H04R 25/554 |
| 2017/0332186 | A1* | 11/2017 | Riggs | H04S 3/008 |
| 2020/0296510 | A1* | 9/2020 | Li | H04R 1/1083 |
| 2022/0038836 | A1* | 2/2022 | Carlsson | H04R 5/04 |
| 2022/0295204 | A1* | 9/2022 | Garcia | G06N 20/00 |
| 2023/0076871 | A1* | 3/2023 | Müller | H04R 25/70 |

* cited by examiner

METHOD, HEARING SYSTEM, AND COMPUTER PROGRAM FOR IMPROVING A LISTENING EXPERIENCE OF A USER WEARING A HEARING DEVICE

RELATED APPLICATIONS

The present application claims priority to EP Patent Application No. EP21195745, filed Sep. 9, 2021, the contents of which are hereby incorporated by reference in their entirety.

BACKGROUND INFORMATION

A hearing system may comprise a hearing device and a user device, which is coupled to the hearing device. For example, the user device may be a handheld device, e.g. a smart phone or tablet computer. The hearing device may be a hearing aid.

Hearing devices are generally small and complex devices. Hearing devices can include a processor, microphone, an integrated loudspeaker as a sound output device, memory, housing, and other electronical and mechanical components. Some example hearing devices are Behind-The-Ear (BTE), Receiver-In-Canal (RIC), In-The-Ear (ITE), Completely-In-Canal (CIC), and Invisible-In-The-Canal (IIC) devices. A user can prefer one of these hearing devices compared to another device based on hearing loss, aesthetic preferences, lifestyle needs, and budget.

The properties of surroundings of the user, such as e.g. the size of a room in which the user is, any reverberation within the room, etc., affect the acoustics of the room and may increase the listening effort of the user and/or may decrease the intelligibility. Modern hearing devices may provide several features that aim to facilitate speech intelligibility, or to improve sound quality and hearing comfort for the wearer. Not all features provide the same benefit in the same acoustic situation, which is why modern hearing devices often provide an environment classification in order to automatically adapt the feature parameters, such as the Noise Canceller or the Beamformer Strength, if the acoustic situation changes. Depending on the classified acoustic situation, a set of feature parameters is selected as a determined sound program. With such an environment classification, an acoustic situation the wearer is in is classified and consequently categorized in order to automatically adjust the features and/or values of parameters of these features in accordance with the current acoustic situation.

However, the accuracy of such classification systems has its limits, what may lead to a misclassification of the acoustic situation. For example, in an acoustic situation such as a one-to-one conversation in a bar with multiple talkers and music in the background, there may be conflicts between the listening intention of the user and the classification of the corresponding hearing device. The music could be dominant enough to trigger the classification, so that the system provides the best experience for listening to music rather than the best intelligibility of the conversation partner or vice versa. Also, several music tracks contain acoustic features that do not trigger the classifier to recognize it as music, wherein this may also apply to single parts of the same song, such as parts with ambient noise or speech without specific musical intonation.

In everyday lives of hearing device wearers, most categories of the classifier often occur in acoustically non-optimized environments. Additional noise by reverberation can easily disrupt sound quality and speech intelligibility for the user. For example, bad room acoustics may be reflected only in a class "Reverberant Speech", though e.g. a "Speech in Noise" class may as well occur in reverberated scenarios. Such room acoustic aspects may be not represented in the same continuous way as occurs in every day listening scenarios.

Many listening environments contain known audio content, such as known music tracks, jingles of advertisements, or typical notification signals such as the jingle that comes before a train station announcement. The audio content may be characterized by a corresponding sound pattern. In other words, the sound pattern may be indicative of the audio content. This audio content may be influenced by the acoustic properties of the surroundings of the user and may be partly masked by the noise of the situation itself.

So, the known environment classification has its limits because the acoustic properties of the surroundings may impede speech intelligibility in complex situations. This leads to a decrease of the listening experience for the user.

BRIEF DESCRIPTION OF THE DRAWINGS

Below, embodiments are described in more detail with reference to the attached drawings.

The reference symbols used in the drawings, and their meanings, are listed in summary form in the list of reference symbols. In principle, identical parts are provided with the same reference symbols in the figures.

DETAILED DESCRIPTION

Figure 1:
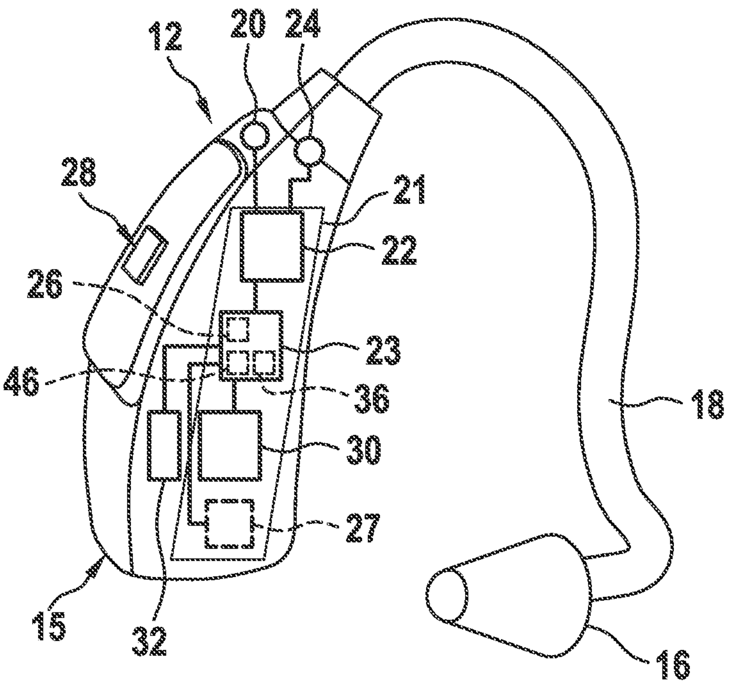
FIG. 1 schematically shows a hearing device according to an embodiment.

Described herein are a method, a hearing system, and a computer program for improving a listening experience of a user wearing a hearing device. Furthermore, the embodiments described herein relate to a computer-readable medium, in which the computer program is stored.

It is a feature described herein to provide a method, a hearing system, and a computer program for improving a listening of a user wearing a hearing device, which may enable to enhance, adapt, and/or modify a classification system of the hearing system and/or a modification of a generated audio signal in accordance with an acoustic environment of the user. Further, it is a feature described herein to provide a computer-readable medium, in which the computer program is stored.

An aspect relates to a method for improving a listening experience of a user wearing a hearing device of a hearing system. The hearing device comprises at least one sound input component for generating an audio signal, a sound processing module for modifying the audio signal, and at least one sound output component for outputting the modified audio signal. The method comprises: providing an audio sample based on the audio signal generated by the sound input component; determining, whether the audio sample comprises an audio content matching a predetermined sound pattern indicative of an original version of the audio content, by analyzing the received audio sample; comparing the audio sample with the original version of the audio content, if the audio sample is determined to comprise the audio content matching the predetermined sound pattern; determining at least one acoustic property of current surroundings of the user depending on the comparison; determining at least one parameter for modifying the audio signal depending on the determined acoustic property; modifying, by the sound processing module, the audio signal generated by the sound input component, in accordance with the determined parameter; and outputting the modified audio signal to the user.

Comparing the audio sample with the original version of the audio content enables to determine the acoustic properties of the acoustic environment of the user more accurately as with conventional methods for improving a listening of a user wearing a hearing device of a hearing system. The determination of the acoustic properties enables to accurately adapt the modification of the audio signal by the parameter such that the listening of the user is improved, in particular in its current acoustic situation.

The original version of the audio content may be treated like a calibration signal for calibrating the sound processing module of the hearing device in accordance with the current acoustic properties of the environment of the user. Thereby, the circumstance can be exploited that this calibration signal is sent through the system under investigation, i.e. the surroundings, e.g. the environment and/or room the user is in, before it can be received by the sound input component as acoustic waves which are influenced and modified by the acoustic properties of the surroundings. The sound input component generates the audio signal such that it represents the influenced and modified acoustic waves. Then, the generated audio signal, in particular an audio sample based on the generated audio signal, can be compared to the original calibration signal, i.e. the original version of the audio content, wherein this comparison allows to draw conclusions about the influence and modification of the acoustic waves in the current surroundings and as such about the acoustic properties of the surroundings. This calibration enables to accurately adapt the modification of the audio signal by the parameter such that the listening of the user is improved, in particular in its current acoustic situation.

Thus, the method improves the listening of the user and enables to enhance, adapt, and/or modify the classification system of the hearing system and/or the modification of the received audio signal in accordance with the acoustic environment of the user. So, the audio recognition is used to improve, e.g. optimize, the listening experience to the user, in particular in complex acoustic situations.

In some instances, the audio signal modified by the sound processing module may correspond to the audio signal generated by the sound input component after the at least one parameter for modifying the audio signal has been determined depending on the determined acoustic property. In some instances, the audio sample may be provided based on the audio signal generated by the sound input component at a first time, and the audio signal modified by the sound processing module may correspond to the audio signal generated by the sound input component at a second time, which may be after the first time. For example, the audio sample may be branched off from the audio signal at a first time and the audio signal, which meanwhile maybe changed, may be modified in accordance with the parameter derived from the comparison of the audio sample with the original version of the audio content at a second time after the first time. In some instances, the audio sample as a whole may be compared with the original version of the audio content. Thus, every influence and all sounds generated by the surroundings may be taken into account, even if they are not related to the audio content, e.g. background noise, voices of other people, etc. In some instances, the audio sample may be compared with the original version of the audio content with regard to part of the information contained in the audio sample. For example, only a temporal section of the audio sample which may be likely to contain the audio content matching the predetermined sound pattern and/or only a frequency band of the audio sample relevant for the original version of the audio content may be taken into account when comparing the audio sample with the original version of the audio content. In some instances, the audio sample may be provided as a copy of at least a temporal section of the generated audio signal. In some instances, the audio sample may be processed, for instance by a filtering, before the comparing of the audio sample with the original version of the audio content.

Room acoustics and acoustic situations may be assessed by said comparing, for instance a comparing of a clean original audio content with a noisy or reverberant audio sample sensed within the current room. Information gained by the comparing on the acoustic properties of the room and/or the current acoustic situation may improve any system steering parameters of the hearing device.

The sound input component may be configured to detect a sound in the current surroundings of the user, in particular in an ambient environment of the hearing device, and to generate the audio signal based on the detected sound. For instance, the sound input component may be implemented as a microphone or a microphone array.

In some implementations, the audio signal may be continuously generated by the sound input component. The continuously generated audio signal may be referred to as audio stream. The audio sample may be continuously provided based on the continuously generated audio signal, or as at least one temporal section of the continuously generated audio signal. For example, the audio signal may be generated continuously and the audio sample may be a part of the audio signal which is limited in time, e.g. the audio sample may have a duration of several milliseconds to a few seconds. The audio sample in the form of a part of the continuous audio signal limited in time may also be repeatedly provided, e.g. with an interruption during which a part of the continuously generated audio signal is omitted in the audio sample. For instance, the interruption may have a duration of several milliseconds to a few seconds. The original version of the audio content may be a clean, digital, and/or unprocessed version of the audio content. The original version of the audio content may be given as raw and/or unprocessed audio data. The original version of the audio content may be characterized by the corresponding sound pattern, i.e. the predetermined sound pattern. The predetermined sound pattern may be a pattern of different pitch levels and length of sounds, which are characteristic for the respective audio content.

On modern handheld user devices such as smartphones, smartwatches or tablet computers, applications for music recognition are well established. Each of these applications embodies or comprises a audio recognition module for recognizing one or more known audio contents, such as a known music track, a jingle, an audio book, a recurring public announcement, or a computer generated voice message. Such audio recognition modules are able to detect the audio content in noisy environments by analyzing and comparing its specific sound pattern, although the audio content at the receiving end is strongly influenced by some sound processing in the audio system, which replays the audio content, the room acoustics of the room, in which the user is, and a transfer function depending on the user's position relative to the audio system within the room. The hearing system may comprise such an audio recognition module for analyzing the audio signal. The audio recognition module may be arranged in the hearing device or the user device connected to the hearing device. The audio recognition module may analyse the audio sample to determine, whether the audio sample comprises the audio content matching the predetermined sound pattern indicative of the original version of the audio content. Alternatively, the audio recognition module sends the audio sample to a remote server, wherein the remote server analyses the audio sample to determine, whether the audio sample comprises the audio content matching the predetermined sound pattern indicative of the original version of the audio content, and sends the original version of the audio content to the hearing device or the user device for comparison with the audio sample.

Further, in case of a music track, such applications may be designed to provide information about e.g. an interpret, title or album of the music track to the user. Additionally to such meta data about the music track, a link to the music track itself is at hand, which makes the raw and unprocessed audio data of the corresponding music track available.

So, as the original audio content is unprocessed, it may be treated like the above calibration signal. The comparison of the unprocessed audio content with the processed audio sample containing the audio content through the hearing device enables the estimation of the acoustic properties of the surroundings. With acoustic properties such as e.g. a reverberation time or direct-to-reverberant-ratio, the hearing device processing might be optimized for the room that the scene takes place in. This allows for finer adjustments of time constants of e.g. noise canceller or dereverberation algorithms. Additionally, a classifier of the hearing system may be adjusted accordingly.

The method may be a computer-implemented method, which may be performed automatically by a hearing system, part of which the user's hearing device is. The hearing system may, for instance, comprise one or two hearing devices used by the same user. One or both of the hearing devices may be worn on or in an ear of the user. The hearing device may be a hearing aid, which may be adapted for compensating a hearing loss of the user. Also, a cochlear implant may be a hearing device. Further, a hearable or consumer electronics device, such as e.g. an in-ear- or earplug-speaker, may be considered a hearing device, at least if it does sound processing. The hearing system may optionally further comprise at least one connected user device, such as a smartphone, smartwatch, other devices carried by the user or a personal computer of the user etc. The hearing system may further include, by way of example, a second hearing device worn by the same user.

According to an embodiment, the predetermined sound pattern may be a music track, a jingle, an audio book, a recurring public announcement, or a computer generated voice message. The music track may be a known music track, which may be recognized by the audio recognition module, wherein the original version of the music track may be downloaded from a corresponding public or private music library. The music track may be a normal song or a theme song of a film, a theatre play, a musical or a TV serial. The jingle may be a signature tune of a company or a certain product of a company, may belong to commercials, or may characterize the beginning or ending of a public announcement, e.g. in a train station or airport. The music track, the jingle, the audio book, the recurring public announcement, or, respectively, the computer generated voice message of the received audio signal provide several tones, chords, sound sequences with known tone pitches, tone-lengths and pauses between tones and as such a huge amount of information which may be compared to the corresponding information of the original version of the corresponding music track, jingle, audio book, recurring public announcement, or, respectively, computer generated voice message in order to determine one or more of the acoustic properties of the surroundings of the user. This enables to very accurately determine these acoustic properties.

According to an embodiment, the acoustic property may be one or more of the group of outdoor, indoor, room size, room acoustic, position of the user within the room, amount of people within the room, reverberation, reverberation time, e.g. RT20 or RT60, direct-to-reverberant-ratio, acoustic absorption spectrum, specific room modes in a room.

According to an embodiment, the parameter may be one or more of the group of frequency dependent gain, time constants for attack and release times of compressive gain, e.g. a speed at which a level-dependent gain is changed, e.g. a slower gain compression change rate in more reverberant environments and/or a faster gain compression change rate in less reverberant environments, time constant for noise canceller, time constant for dereverberation algorithms, reverberation compensation, frequency dependent reverberation compensation, mixing ratio of channels, gain compression strength, gain shape/amplification scheme. When determining the parameter for modifying the audio signal depending on the determined acoustic property, the parameter as such may be determined, i.e. it may be determined which one of adjustable parameters may be adjusted, and/or a value of the corresponding parameter may be determined.

According to an embodiment, the received audio signal of the sound input component is sent to a user device of the hearing system, with the user device being coupled to the hearing device and comprising the audio recognition module for determining, whether the audio signal comprises the audio content matching the predetermined sound pattern. Recognizing the audio content matching the predetermined sound pattern within the received audio signal requires a large amount of processing resources. Outsourcing the audio recognition to the user device by arranging the audio recognition module in the user device enables to unburden the generally very compact hearing device with respect to this processing load. Further, there are already a bunch of audio recognition applications for handheld user devices present on the market and it may be quite easy and/or cost efficient to use at least in part the audio recognition features of such an application in order to determine the predetermined sound pattern within the received audio signal.

Alternatively, as explained above, the hearing device or the user device may send the audio sample to a remote server, which determines, whether the audio signal comprises the audio content matching the predetermined sound pattern, and which sends the original version of the audio content to the hearing device or the user device. The remote server may be connectable to the hearing device and/or user device of the user and/or to the hearing device and/or to user devices of a plurality of other users.

According to an embodiment, the audio sample of the received audio signal is compared with the original version of the audio content by the user device; the acoustic property of current surroundings of the user is determined by the user device; and an information about the determined acoustic property is sent from the user device to the hearing device. Then, the hearing device may determine the parameter depending on this acoustic property. Comparing the audio content of the received audio signal with the original version of the audio content and determining the acoustic property of the current surroundings of the user device requires a large amount of processing resources. Outsourcing the comparison and the determination of the acoustic property to the user device enables to unburden the generally very compact hearing device with respect to this processing load. Alternatively, the comparison may be carried out by the remote server. Further, the at least one acoustic property of the current surroundings of the user may be determined depending on the comparison by the remote server.

According to an embodiment, the audio content of the received audio signal is compared with the original version of the audio content by the user device; the acoustic property of current surroundings of the user is determined by the user device; the parameter for modifying the audio signal depending on the determined acoustic property is determined by the user device; and the determined parameter is sent from the user device to the hearing device. Then, the hearing device may modify the audio signal in accordance with the correspondingly received parameter. Comparing the audio sample of the received audio signal with the original version of the audio content, determining the acoustic property of current surroundings of the user, and determining the parameter depending on the acoustic property requires a large amount of processing resources. Outsourcing the comparison, the determination of the acoustic property, and the determination of the parameter to the user device enables to unburden the generally very compact hearing device with respect to this processing load. Alternatively, the comparison, the determination of the acoustic property, and the determination of the parameter to the user device may be outsourced to the remote server.

According to an embodiment, the original version of the audio content is loaded from a local or remote storage means, if the audio content or its characteristic sound pattern is recognized within the audio sample. If the audio content is relative short in time, e.g. in case of a jingle, the original version of the audio content may be stored in the hearing device or the user device. This enables to carry out the method without any connection to the internet. If the audio content is relatively long, e.g. in case of an average music track, the original version of the sound pattern may be stored remotely, e.g. on a server, such that the corresponding data may not be stored on the hearing device or the user device in advance. This is particularly advantageous, if there is a huge amount of audio contents which may be used for calibrating the hearing device against its acoustic environment.

It has to be understood that features of the method as described above and in the following may be features of the hearing system, the computer program, and the computer-readable medium as described above and in the following, and vice versa.

An aspect relates to the hearing system for improving the listening of the user wearing the hearing device. The hearing system comprises the hearing device and optionally the user device coupled to the hearing device. The hearing device comprises at least one sound input component for generating an audio signal; an audio provision module for providing the audio sample based on the audio signal generated by the sound input component; a sound processing module for modifying the audio signal; and at least one sound output component for outputting the modified audio signal to the user. The hearing system comprises the audio recognition module for determining whether the audio sample comprises the audio content matching the predetermined sound pattern indicative of the original version of the audio content by analyzing the audio sample; and an audio comparison module for comparing the audio sample of the received audio signal with the original version of the audio content, if the audio sample is determined to comprise the audio content matching the predetermined sound pattern, and for determining at least one acoustic property of current surroundings of the user depending on the comparison. The audio provision module or the audio comparison module is configured for determining at least one parameter for the modification of the audio signal depending on the determined acoustic property.

The comparison of the audio content of the received audio signal and the original, clean version of the audio content may be done either on the hearing device, any other user device connected to the hearing device or with help of any cloud computing network, e.g. the remote server, which is in communicatively coupled with the hearing device and/or the connected user device.

According to an embodiment, the hearing system further comprises a transceiver for loading the original version of the audio content, if the audio sample is determined to comprise said audio content matching the predetermined sound pattern.

According to an embodiment, the hearing device comprises the audio recognition module and the audio comparison module. This enables the hearing device to carry out the above method without any connection to another device or server.

According to an embodiment, the user device coupled to the hearing device comprises the audio recognition module and the audio comparison module. This enables to outsource the resource consuming audio recognition and audio comparison to the user device and as such to relieve the hearing device.

According to an embodiment, the audio recognition module is configured to send the audio sample to the remote server for determining whether the audio sample comprises the audio content matching the predetermined sound pattern. In this case, the remote server optionally may comprise the audio comparison module.

An aspect relates to a computer program for improving the listening of the user wearing the hearing device. The computer program is adapted to carry out the above method, when being executed by a processor. For example, the computer program may be executed in a first processor of the hearing device, which hearing device, for example, may be carried by the person behind or in the ear. The computer program also may be executed by a second processor of the connected user device, such as a smartphone, smartwatch, tablet, or any other type of mobile user device, which may be a part of the hearing system. It also may be that some steps of the method are performed by the hearing device and other steps of the method are performed by the connected user device. Further, some of the steps may be outsourced to the connected remote server.

An aspect relates to a computer-readable medium, in which the above computer program is stored. The computer-readable medium may be a memory of the above hearing device or a memory of the user device connected to the hearing device. The computer-readable medium may be a floppy disk, a hard disk, an USB (Universal Serial Bus) storage device, a RAM (Random Access Memory), a ROM (Read Only Memory), an EPROM (Erasable Programmable Read Only Memory) or a FLASH memory. The computer-readable medium may also be a data communication network, e.g. the Internet, which allows downloading a program code. The computer-readable medium may be a non-transitory or transitory medium.

All or some of the above modules may be embodied in hardware or in software or in a combination of hardware and software. Further, all or some of the above modules may be consolidated in one single module.

These and other aspects will be apparent from and elucidated with reference to the embodiments described hereinafter.

FIG. 1 schematically shows a hearing device 12 according to an embodiment. The hearing device 12 is formed as a behind-the-ear device carried by a hearing device user (not shown). It has to be noted that the hearing device 12 is a specific embodiment and that the method described herein also may be performed with other types of hearing devices, such as e.g. an in-the-ear device or one or two of the hearing devices mentioned above.

In the illustrated example, the hearing device 12 comprises a part 15 behind the ear and a part 16 to be put in the ear channel of the user. The part 15 and the part 16 are connected by a tube 18. In the part 15, at least one sound input component 20, e.g. a microphone, a processing unit 21 and a sound output component 24, such as a loudspeaker, are provided. The sound input component 20 may detect a sound in an ambient environment of the hearing device 12 and may generate an audio signal from the detected sound. The processing unit 21 is communicatively coupled to the sound input component 20. The processing unit 21 can thus receive the audio signal generated by the sound input component 20. The processing unit 21 may include a sound processing module 22. For instance, the sound processing module 22 may be implemented in a computer program executed by the processing unit 21. Alternatively, the sound processing module 22 may be implemented in hardware communicating with the processing unit 21. The sound processing module 22 may be configured to amplify, dampen and/or delay the audio signal, e.g. some frequencies or frequency ranges of the audio signal depending on parameter values of parameters, which influence the amplification, the damping and/or, respectively, the delay. The parameter may be one or more of the group of frequency dependent gain, time constant for attack and release times of compressive gain, time constant for noise canceller, time constant for dereverberation algorithms, reverberation compensation, frequency dependent reverberation compensation, mixing ratio of channels, gain compression, gain shape/amplification scheme. A set of one or more of these parameters and parameter values may correspond with a predetermined sound program, wherein different sound programs are characterized by correspondingly different parameters and parameter values. The sound program may comprise a list of sound processing features. The sound processing features may for example be a noise cancelling algorithm or a beamformer, which strengths can be increased to increase speech intelligibility but with the cost of more and stronger processing artifacts. The sound output component 24 may generate a sound from the amplified or dampened audio signal. The generated sound may be guided through the tube 18 and the in-the-ear part 16 into the ear channel of the user.

The hearing device 12 may comprise a control module 23. The control module 23 may be implemented in a computer program executed by the processing unit 21. Alternatively, the control module 23 may be implemented in hardware communicating with the processing unit 21. The control module 23 may comprise a sound processing adjustment module for setting, adjusting and/or amending the parameters of the sound processing module 22. These parameters may be determined by a computer program, which may be executed by the processing unit 21 and which may correspond to or may comprise the computer program explained with respect to FIG. 3. The user may select a modifying parameter (such as bass, treble, noise suppression, dynamic volume, etc.) and levels and/or values of these modifiers may be selected, e.g. with an input mean 28, e.g. a knob, a button, or a touch-sensitive sensor, e.g. capacitive sensor, of the hearing device 12. From these modifiers, an adjustment command may be created and processed as described above and below. In particular, processing parameters may be determined based on the adjustment command and based on this, for example, the frequency dependent gain and the dynamic volume of the sound processing module 22 may be changed. All these functions may be implemented as different sound programs stored in a memory 30 of the hearing device 12, which sound programs may be executed by the sound processing module 22. The memory 30 may be implemented by any suitable type of storage medium and is configured to maintain, e.g. store, data controlled by the processing unit 21, in particular data generated, accessed, modified and/or otherwise used by the processing unit 21. The memory 30 may also be configured to store instructions for operating the hearing device 12 and/or a connected user device that can be executed by the processing unit 21, in particular an algorithm and/or a software that can be accessed and executed by the processing unit 21. The sound programs may be selected, mixed and controlled by the control module 23.

The control module 23 may further comprise an audio provision module 26 adapted for providing an audio sample based on the audio signal generated by the sound input component 20. For instance, the audio provision module 26 may be configured to receive the audio signal directly from the sound input component 20, or to receive the audio signal from the sound processing module 22 after the sound processing module 22 has received the audio signal from the sound input component 20. Further, the audio signal may be continuously generated by the sound input component 20 and continuously received by the audio provision module 26 within a certain period of time. The audio provision module 26 may then be configured to provide the audio sample continuously within this period of time or to provide the audio sample discontinuously in interrupted time intervals within this period of time. The audio sample provided by the audio provision module 26 may correspond to the audio signal generated by the sound input component 2, or the audio provision module 26 may process the audio signal generated by the sound input component 2, for instance by applying a filter, before providing the audio sample based on the audio signal. In some instances, the audio provision module 26 may provide the audio sample based on the generated audio signal by extracting and/or branching off a continuous or a timely limited sequence of the audio signal as the audio sample.

As illustrated, the control module 23 may further comprise an audio recognition module 46 and an audio comparison module 36. An operating principle of the audio recognition module 46 and the audio comparison module 36 is further described below in conjunction with FIG. 2, wherein the audio recognition module 46 and the audio comparison module 36 are implemented in a user device 70 connected to the hearing device 12. In the embodiment illustrated in FIG. 1, the audio recognition module 46 and the audio comparison module 36 can be implemented in the hearing device 12 in order to provide a corresponding functionality. In some implementations, a hearing system may then be formed by the hearing device 12 without a user device which would be connected to the hearing device for providing the functionalities of the audio recognition module 46 and the audio comparison module 36.

The hearing device 12 further comprises a transceiver 32. The transceiver 32 may be configured for wireless data communicated with a remote server. The audio sample provided by the audio provision module 26 may thus be communicated to the remote server, in particular by the audio recognition module 46, as further described below. Moreover, an original version of an audio content contained in the audio sample may be communicated from the remote server, in particular to the audio comparison module 36, as further described below. Additionally or alternatively, the transceiver may be a first transceiver 32 which may be adapted for wireless data communication with a second transceiver 34 of a connected user device 70 (see FIG. 2). The transceiver 32, 34, in particular the first and/or the second transceiver 32, 34, may be e.g. a Bluetooth or RFID radio chip.

In some instances, the hearing device 12 may further comprise a classifier 27 configured to identify one or more predetermined classification values based on a signal from the sound input component 20 and/or from a further sensor (not shown in the figures). The classification value may be used to determine the sound program to be currently used, and as such the corresponding parameters and parameter values, which may be automatically used by the hearing device 12, in particular depending on the sound input received via the sound input component 20 and/or in case the sensor. The sound input may correspond to a speaking activity and/or acoustic environment of the user. The classifier 27 may be implemented in a computer program executed by the processing unit 21.

Each of the control module 23, the audio provision module 26, the audio recognition module 46, the audio comparison module 36, the classifier 27 and the sound processing module 22 may be embodied in hardware or software, or in a combination of hardware and software. Further, at least two of the modules 22, 23, 26, 27, 36, 46 may be consolidated in one single module or may be provided as separate modules. The processing unit 21 may be implemented as a single processor or as a plurality of processors. For instance, the processing unit 21 may comprise a first processor in which the sound processing module 22 is implemented, and a second processor in which the audio provision module 26, the audio recognition module 46, and the audio comparison module 36 are implemented. In cases in which the classifier 27 is provided, it may be implemented in any of the first or second processor or an additional processor.

Figure 2:
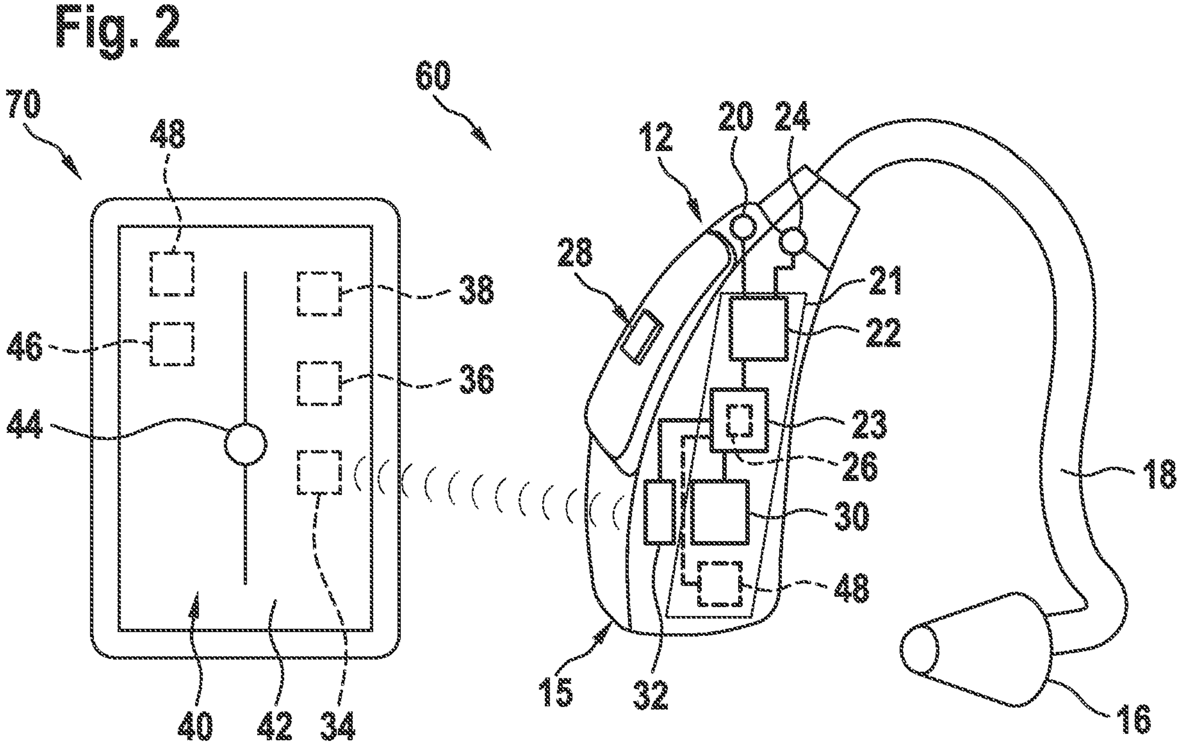
FIG. 2 schematically shows a hearing system according to an embodiment.

FIG. 2 schematically shows a hearing system 60 according to an embodiment. The hearing system 60 includes a hearing device, e.g. the above hearing device 12, and a connected user device 70, such as a smartphone or a tablet computer. For clarity reasons, FIG. 2 does not show all components of the hearing device 12 of FIG. 1. However, the hearing device 12 shown FIG. 2 may comprise the same components as the hearing device of FIG. 1. The user device 70 may comprise the second transceiver 34, a memory 38, a graphical user interface 40, a processing unit (not shown), and a display 42. A processing unit of the hearing system 60 may comprise the processing unit 23 of the hearing device 12 and the processing unit of the user device 70, which may communicate with each other via the first and second transceiver 32, 34. The memory 30 of the hearing device 12 is denoted as a first memory and the memory 38 of the user device 70 is denoted as a second memory of the hearing system 60. The hearing system 60 further comprises the sound processing module 22, the audio provision module 26, the audio recognition module 46, and the audio comparison module 36, which may be implemented in a computer program executed by the processing unit of the hearing system 60. As illustrated, the audio provision module 26 may be implemented in control module 23 of the hearing device 12, and the audio recognition module 46 and the audio comparison module 36 may be implemented in a computer program executed by the processing unit of the user device 70. Other configurations are conceivable such as, for instance: the audio provision module 26 and the audio comparison module 36 may be implemented in a computer program executed by the processing unit 21 of the hearing device 12, and the audio recognition module 46 may be implemented in a computer program executed by the processing unit of the user device 70. Each of the modules 22, 26, 36, 46 may be embodied in hardware or software, or in a combination of hardware and software.

In some instances, alternatively or additionally to the classifier 27 of the hearing device 12, which may be denoted as a first classifier, the connected user device 70 may comprise a second classifier 48. The second classifier may classify the acoustic environment of the hearing device 12, e.g. in addition or as an alternative to the first classifier 27.

The audio recognition module 46 may be implemented in the hearing device 12 or in the user device 70, as shown in FIG. 2. The audio recognition module 46 is configured to identify an audio content, e.g. a music track, a jingle, an audio book, a recurring public announcement, or a computer generated voice message, in a digital audio sample, e.g. extracted from the audio signal generated by the sound input component 20. In some implementations, the audio recognition module 46 can be configured to send the audio sample to a remote server, for instance via the first or second transceiver 32, 34 or an additional transceiver provided in the user device 70 or in the hearing device 12, for identifying the audio content, in particular for determining whether the audio sample comprises the audio content matching the predetermined sound pattern. The remote server can be configured for data exchange with hearing devices and/or user devices of a plurality of users. In this way, audio samples comprising a recorded version of the audio content may be retrieved by the remote server from the plurality of users in order to determine the sound pattern indicative of an original version of the audio content. For instance, in order to determine the sound pattern, a machine learning algorithm may be trained on the remote server based on the original version of the audio content and a set of recorded samples of the original version of the audio content in various acoustic environments which can thus be associated with the original version of the audio content. The machine learning algorithm may be further trained on the remote server based on the audio samples provided by the hearing devices and/or user devices of different users in which the audio content may be recognized by the pretrained machine learning algorithm beforehand to be associated with the original version of the audio content. The thus predetermined sound pattern may thus be implemented in a trained machine learning algorithm. The predetermined sound pattern can then be employed by the audio recognition module 46 to determine whether an audio sample comprises the audio content matching the predetermined sound pattern, for instance by transmitting the audio sample to the remote server which can then return a confirmation to the audio recognition module 46 whether the audio sample comprises the audio content matching the predetermined sound pattern or not. In some implementations, the determining whether the audio sample comprises the audio content matching the predetermined sound pattern may be performed by the audio recognition module 46 on-site without data exchange with a remote server. For instance, the audio recognition module 46 may be provided with an algorithm configured to recognize the predetermined sound pattern in the audio sample, e.g. a pretrained machine learning algorithm configured to predict whether the audio sample comprises the audio content matching the predetermined sound pattern. The training of the machine learning algorithm may be performed in the above described way, e.g. on a remote server. After the training, the pretrained machine learning algorithm may be transferred from the remote server to the audio recognition module 46. The audio recognition module 46 may be one of the audio recognition applications already on the market and known to the person skilled in the art. The audio comparison module 36 may be implemented in the hearing device 12 or in the user device 70, as shown in FIG. 2. The audio comparison module 36 is configured to compare the audio sample with the original version of the audio content; to determine at least one acoustic property of current surroundings of the user depending on the comparison; and to determine at least one parameter for modifying the audio signal depending on the determined acoustic property. Before the comparing, the original version of the audio content may be provided to the audio comparison module 36 from a remote server connected to the hearing system and/or a memory of the hearing system in which the original version of the audio content can be stored. Based on the comparison, a transfer function may be derived which can be representative of at least one acoustic property of current surroundings of the user.

With the hearing system 60 it is possible that the above-mentioned modifiers and their levels and/or values are adjusted with the user device 70 and/or that the adjustment command is generated with the user device 70. This may be performed with a computer program run by the processing unit of the user device 70 and stored in the second memory 38. The computer program may provide the graphical user interface 40 on the display 42 of the connected user device 70.

For example, for adjusting the modifier, such as volume, a frequency dependent gain or a time constant, the graphical user interface 40 may comprise a control element 44, such as a slider. When the user adjusts the slider, the adjustment command may be generated, which will change the parameter value of the corresponding parameter, as such the current sound program, and as such in turn the sound processing of the hearing device 12 as described above and below. Alternatively or additionally, the user may adjust the modifier with the hearing device 12 itself, for example via the input means 28.

The first and/or second classifier 27, 48 may evaluate the received audio signal so as to identify a state corresponding to the user's speaking activity and/or the user's acoustic environment, and at least one classification value may be determined depending on the identified state. The one or more classification values characterize the identified state. The identified classification value(s) may be, for example, output by one of the classifiers 27, 48 to one or both of the modules 26, 36. It also may be that at least one of the classifiers 27, 48 is implemented in the corresponding controller 26, 36 itself or may be stored as a program module in one of the memories 30, 38 so as to be performed by the corresponding controller 26, 36.

The above identified state may be one or more of the group of Speech In Quiet, Speech In Noise, Being In Car, Reverberant Speech, Noise, Music, Quiet, and Speech In Loud Noise. Optionally, two or more classification values may be determined characterizing the user's speaking activity and/or the user's acoustic environment by evaluating the audio signal. In case, an active sound program may be adapted to the corresponding determined two or more classification values. The one or more predetermined classification values may be identified based on the audio signal from the at least one sound input component 20 received over one or more predetermined time intervals, e.g. over two identical predetermined time intervals separated by a predetermined pause interval.

Figure 3:
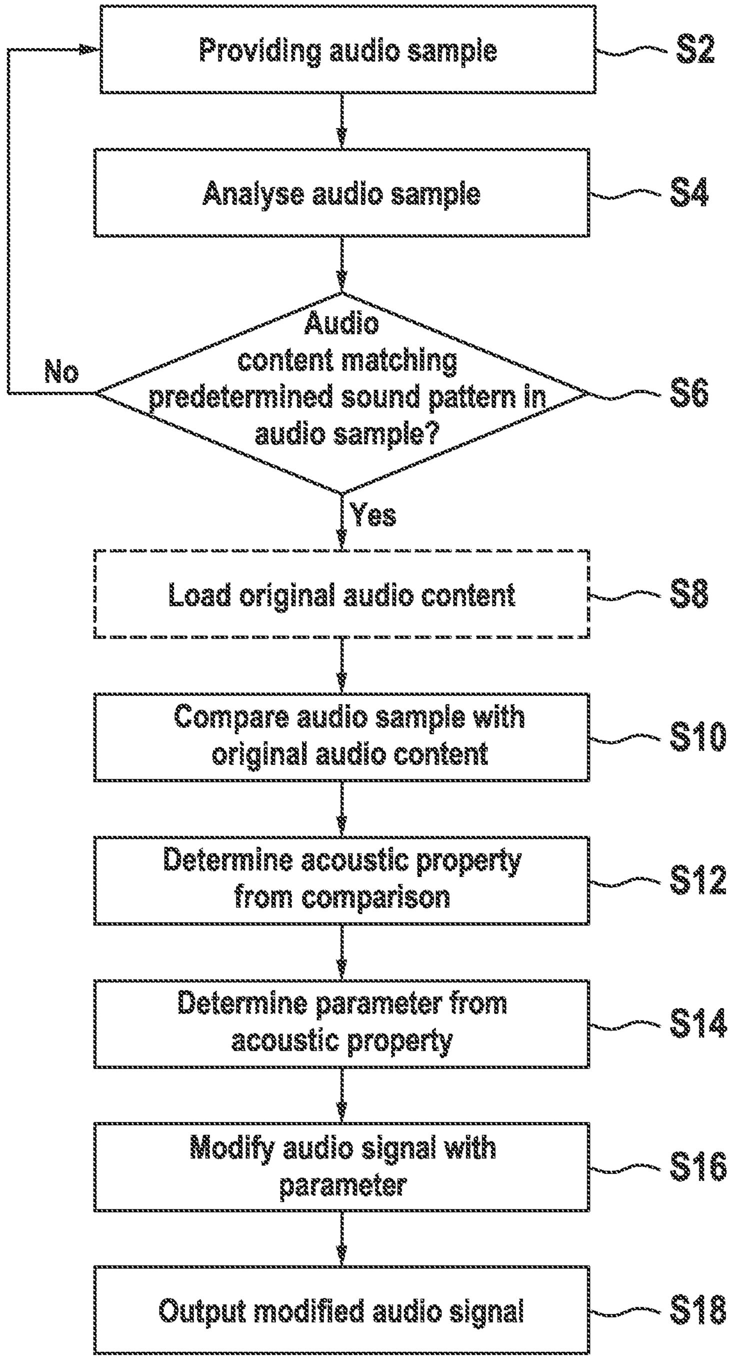
FIG. 3 shows a flowchart of an exemplary embodiment of a method for improving a listening experience of a user wearing a hearing device.

FIG. 3 shows a flowchart of an exemplary embodiment of a method for improving a listening experience of a user wearing a hearing device, for example the user wearing the above hearing device 12. The method may contribute to improve the listening of the user and may enable to enhance, adapt, and/or modify the above described classification system of the hearing device 12 and/or the modification of the received audio signal in accordance with the acoustic environment of the user. In particular, the method uses audio recognition to improve, e.g. optimize, the listening to the user, in particular in complex acoustic situations. The method may be started, when the hearing system 60, the hearing device 12, and/or the user device 70 is activated. Alternatively, the method may be started upon a predetermined user input of the user.

In step S2, the audio sample is provided based on the audio signal from the sound input component 20, e.g. by the audio provision module 26. Providing the audio sample based on the audio signal may comprise extracting or branching off the audio sample from the audio signal, in particular before the audio signal is input to the sound processing module 22 and/or after the audio signal is output from the sound processing module 22. A processing of the audio signal by the sound processing module 22, on the one hand, and of the audio sample by the audio recognition module 46 and the audio comparison module 36, on the other hand, may thus be performed at least partially in parallel and/or at least partially in sequence to one another. In some instances, extracting or branching of the audio sample from the audio signal may imply providing a copy of at least part of the audio signal generated by the sound input component 20. In some instances, extracting or branching of the audio sample from the audio signal may also imply a processing of the copy of at least part of the audio signal, for instance a filtering of the audio signal and/or a scaling down of the copy, e.g. by reducing a duration of the copy of at least part of the audio signal. The processing of the copy of at least part of the audio signal may be performed by the audio provision module 26. In some implementations, the audio signal generated by the sound input component 20 can be processed before the providing of the audio sample based on the audio signal by the audio provision module 26. For instance, the audio signal generated by the sound input component 20 may be input to the audio provision module 26 after the audio signal is modified and output from the sound processing module 22. Providing of the audio sample based on the audio signal by the audio provision module 26 may then comprise extracting or branching off the audio sample output from the sound processing module 22. Outputting of the audio signal modified by the sound processing module 22, on the one hand, and processing of the audio sample by the audio recognition module 46 and the audio comparison module 36, on the other hand, may then be performed at least partially in parallel and/or at least partially in sequence to one another. The audio signal may be generated continuously as long as the method is carried out and/or as long as the hearing system 60 is active, wherein one or more audio samples may be provided based on the audio signal. The audio sample may be provided, by the audio provision module 26, in sequence to the audio signal generated by the sound input component 20. When the audio signal is continuously generated by the sound input component 20, the audio signal may be referred to as audio stream. When the audio sample is continuously provided by the audio provision module 26 based on the audio stream, the audio sample may be referred to as a continuous audio sequence based on the audio stream or a temporally limited audio sequence based on a temporal section the audio stream. The temporally limited audio sequence may be repeatedly provided.

In step S4, the received audio sample is analysed with respect to the audio content, e.g. by the audio recognition module 46. Optionally, step S4 may be carried out continuously as long as the method is carried out and/or as long as the hearing system 60 is active. Optionally, the above classification may be carried out in step S4. In some implementations, as described above, the analysis may comprise transferring of the audio sample to a remote server. In some implementations, as also described above, the analysis may be fully performed locally by the audio recognition module 46.

As an outcome of the analysis, in step S6, it is determined whether the audio content of the audio sample matches the predetermined sound pattern indicative of an original version of the audio content, e.g. by the audio recognition module 46. The audio recognition module 46 may correspond to or may be embedded in a known audio recognition application as regularly used on modern smartphones, smartwatches or tablet computers. The audio content may be a known music track, a jingle, an audio book, a recurring public announcement, or a computer generated voice message. The steps S4 and S6 may be carried out simultaneously, wherein step S4 may comprise step S6. If the condition of step S6 is fulfilled, the method proceeds in step S8 or S10. If the condition of step S6 is not fulfilled, the method proceeds again in step S2.

In optional step S8, the original version of the audio content may be loaded. The original version of the audio content may be a clean, digital, and/or unprocessed version of the audio content. The original version may be given as raw and/or unprocessed audio data. For example, the original version of the audio content may be downloaded from the internet and/or a remote server, in particular the remote server to which the audio sample has been transmitted by the audio recognition module 46. The original version of the audio content may also be stored in a non-transitory computer readable medium of the hearing system 60, e.g. in the first or second memory 30, 38, and loaded from this medium. If the original version of the audio content is already present in a volatile memory of the hearing system 60 during steps S4 and S6, e.g. in a volatile memory of the processing unit 21 of the hearing device 12 and/or a volatile memory of the processing unit of the remote device 70, step S8 may be skipped. The original version of the audio content may be previously loaded into the volatile memory at any time, for instance during or after a booting or rebooting of the processing unit 21 of the hearing device 12 and/or the processing unit of the remote device 70, in particular from the remote server and/or the first or second memory 30, 38. For example, if the original version of the audio content is relatively short and as such may be represented by a relatively small amount of data, e.g. in case of a jingle, the original version of the audio content may be may be previously loaded into the volatile memory and/or stored locally, i.e. in the first or second memory 30, 38. For example, in the future, there may be a national or international agreement about a standardised jingle for calibrating hearing devices. This jingle may be replayed in public areas, such as e.g. train stations, airports, and/or public bureaus, and may be used to calibrate hearing systems 60 in these areas. Such a standardised jingle may be played before every announcement as notification to gain attention. The jingle may also be replayed such that it may not be heard by the user but may be recognized by the audio recognition software.

In step S10, the audio sample of the generated audio signal is compared with the original version of the audio content, e.g. by the audio comparison module 36. In particular, it is checked how the audio content of the audio sample influenced by the acoustic properties of the surroundings of the hearing device 12 deviates from the original version of the audio content. In other words, the acoustic properties of the surroundings, e.g. room acoustics, including an acoustic situation within the corresponding room, may be assessed by comparing the clean original audio content gained with the audio recognition module with the noisy or reverberant audio sample sensed within the current room. For example, a transfer function may be derived from the comparison of the original version of the audio content, which may be represented by a known, unprocessed audio content, and the audio sample provided by the audio provision module 26. The transfer function can be representative of at least one acoustic property of current surroundings of the user. For instance, the transfer function can model and/or represent a modification of the original version of the audio content by a technical audio reproduction system. The technical audio reproduction system may be defined as a system which replays the audio content in a room in which the audio signal is presented in in its current state by taking into account all the acoustically effective objects in the room. The transfer function may have multiple forms. For example, the corresponding absorption spectrum may be the transfer function, which could be acquired by just calculating a level difference of each frequency between the raw audio signal, representing the original version of the audio content, and the received audio signal, representing the audio sample. For example, if the original version of the audio content was an exponential sine sweep, which is a known calibration signal, and the received exponential sine sweep would be convoluted with an inverse filter function, the result would be an impulse response which contains spectral and temporal properties of a system in which the sweep is played. In step S12, at least one of the acoustic properties is determined from the comparison of step S10, e.g. by audio comparison module 36. The at least one acoustic property may be one or more of the group of outdoor, indoor, room size, room acoustic, position of the user within the room, amount of people within the room, reverberation, reverberation time, direct-to-reverberant-ratio, acoustic absorption/reflection spectrum, a direct to diffuse ratio, one or more room modes. The acoustic properties of the room may be determined by deriving or estimating them from the above transfer function. The reverberation time may be referred to as RT60. RT60 is the time it takes for an initial level of an impulse to reduce by 60 dB (or 20 dB×3, etc.), which is a standard measure for the reverberance (in German: Halligkeit) of a room. A corresponding procedure for measuring the reverberance is described in norm ISO 3382. The Direct to Diffuse Ratio (DDR) is the level difference between peaks and noise floor in the overall signal, other than SNR. The diffuse part can be described by properties of the room and does not depend on particular sound sources within that room. The DDR is dependent on the microphone's distance to the source and may be used as an estimate for source-receiver distance, i.e. the distance between the hearing device and the speaker outputting the predetermined sound pattern. The absorption/reflection spectrum is dependent on and in turn gives information about a material of the walls, floor and ceiling of the room as well as the volume of the room. The absorption/reflection spectrum may comprise different frequency regions, which may be damped stronger than other frequency regions. The room modes refer to a constructive/destructive interference of reflected sound waves, which may lead to steep peaks and notches within the absorption spectrum. Some positions within the room might produce an amplification/attenuation in specific narrow frequency regions. These room modes may interfere with a perception in the room which may reduce the perceived sound quality.

In some implementations, the audio comparison module 36 may employ at least one of the classifiers 27, 48 to determine at least one acoustic property of current surroundings of the user depending on the comparison. For instance, the audio comparison module 36 may provide the transfer function derived from the comparison to at least one of the classifiers 27, 48, for instance to classify and/or identify acoustically effective objects in the room based on the transfer function. The audio comparison module 36 may also provide the audio sample and the original version of the audio content to at least one of the classifiers 27, 48, wherein the comparing the audio sample with the original version of the audio content can be performed by the respective classifier 27, 48 to determine the at least one acoustic property of the surroundings.

In step S14 at least one parameter for modifying the audio signal depending on the determined acoustic property is determined, e.g. by module 36. The parameter may be one or more of the group of frequency dependent gain, time constants for attack and release times of compressive gain, time constant for noise canceller, time constant for dereverberation algorithms, reverberation compensation, frequency dependent reverberation compensation, mixing ratio of channels, gain compression strength, gain shape/amplification scheme, distance to a sound source within in the room, movement of the user relative to the sound source. The parameter may be one of the parameters of one or more of the above sound programs or an additional parameter. When determining the parameter for modifying the audio signal depending on the determined acoustic property, the parameter as such may be determined, i.e. it may be determined which one of adjustable parameters may be adjusted, and/or a value of the corresponding parameter may be determined.

For example, from the absorption/reflection spectrum the gain shape/amplification scheme may be adjusted. It may be assumed, that the absorption/reflection spectrum has a similar effect on the speakers that surround the user as on the recognized sound source. Therefore, in order to facilitate communication with surrounding speakers, absorbed frequencies that help speech intelligibility might be amplified, and reflected frequencies that impede speech intelligibility might be attenuated. For example, reflections in the room may occur mostly in the low frequencies (typical for a basement). In this case, it would make sense to reduce the gain in the low frequencies, since the room reflections would be amplified otherwise which would not help in speech intelligibility. In this example, the frequency dependent gain would be one of the parameters.

Further, features of the hearing device that estimate the reverberation time RT60 or use the estimated RT60 could benefit from the proposed method. The reverb estimation onboard of the hearing device depends solely on the audio signal, which reduces the quality of the estimation. Deriving the RT60 from an estimated impulse response, i.e. the predetermined sound pattern received with the audio signal, may provide a more accurate estimation of RT60 and thus a better decision of when to apply reverberation-reducing features and by what degree.

Furthermore, the environment classification of the hearing device may benefit from the determined acoustic property, e.g. an accurate estimation of the RT60 may be carried out depending on the acoustic property. The accuracy of detecting of reverberant situations would increase when the reverberant part is derived from an actual acoustic measurement rather than an estimation from knowing only the input signal.

Alternatively or additionally, a measure for the DDR could help to estimate the distance to the sound source in the room, or to detect if sound sources are approaching the user or move away from the user. This could be used to control the strength of a beamformer, since a beamformer always leads to a trade-off between better intelligibility and reduced environmental awareness. An increasing environmental awareness, when approaching sound sources are detected, could increase the user's safety and its comfort.

In step S16, the audio signal is modified, e.g. by the sound processing module 22, in accordance with the determined parameter. The audio signal modified in step S16 may correspond to the audio signal which is generated by the sound input component 20 after the at least one parameter for modifying the audio signal has been determined in step S14. In particular, the audio sample may be provided in step S2 based on the audio signal generated by the sound input component 20 at a first time, and the audio signal modified in step S16 may correspond to the audio signal which is generated by the sound input component 20 at a second time, which may be after the first time.

In step S18, the modified audio signal is output to the user, e.g. by the sound output component 24.

Above steps S2, S16, and S18 may be carried out by the hearing device 12 and all other steps may be carried out by the user device 70. Alternatively, one or more of the steps S4 to S14 may be carried out by the hearing device 12, e.g. depending on the processing resources, memory space, and/or internet connectivity of the hearing device 12. Further, one or more of the steps S4 to S14 may be carried out by the remote server, e.g. depending on the processing resources, memory space, and/or internet connectivity of the hearing device 12 and/or the connected user device 70.

While the embodiments described herein have been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practicing the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

LIST OF REFERENCE SYMBOLS

12 hearing device
15 part behind the ear
16 part in the ear
18 tube
20 sound input component
21 processing unit
22 sound processing module
23 control module
24 sound output component
26 audio provision module
27 classifier
28 input mean
30 memory
32 first transceiver
34 second transceiver
36 audio comparison module
38 second memory
40 graphical user interface
42 display
44 control element, slider
46 audio recognition module
48 second classifier
60 hearing system
70 user device

What is claimed is:

1. A method for improving a listening of a user wearing a hearing device of a hearing system, the hearing device comprising at least one sound input component for generating an audio signal, a sound processing module for modifying the audio signal, and at least one sound output component for outputting the modified audio signal, the method comprising:

providing an audio sample based on the generated audio signal;

determining, whether the audio sample comprises an audio content matching a predetermined sound pattern indicative of an original version of the audio content, by analyzing the audio sample;

comparing the audio sample with the original version of the audio content, if the audio sample is determined to comprise the audio content matching the predetermined sound pattern;

determining at least one acoustic property of current surroundings of the user depending on the comparison;

determining at least one parameter for modifying the audio signal depending on the determined acoustic property;

modifying the generated audio signal by the sound processing module, in accordance with the determined parameter; and outputting the modified audio signal to the user, wherein:

the audio signal is generated from sound that originates in a listening environment in the current surroundings of the user, the sound not being generated by the hearing system;

the original version of the audio content is used as a calibration signal for calibrating the sound processing module of the hearing device; and the original version of the audio content corresponds to a known music track, a known jingle, a known audio book, a known recurring public announcement, or a known computer generated voice message.

2. The method of claim 1, wherein the acoustic property is one or more of the group of outdoor, indoor, room size, room acoustic, position of the user within the room, amount of people within the room, reverberation, reverberation time, direct-to-reverberant-ratio, acoustic absorption/reflection spectrum, a direct to diffuse ratio, one or more room modes, specific room modes in a room.

3. The method of claim 2, wherein the parameter is one or more of the group of frequency dependent gain, time constants for attack and release times of compressive gain, time constant for noise canceller, time constant for dereverberation algorithms, reverberation compensation, frequency dependent reverberation compensation, mixing ratio of channels, gain compression strength, gain shape/amplification scheme.

4. The method of claim 1, wherein the audio sample is sent to a user device of the hearing system, with the user device being coupled to the hearing device and comprising an audio recognition module for determining, whether the audio sample comprises the audio content matching the predetermined sound pattern.

5. The method of claim 4, wherein the audio sample is compared with the original version of the audio content by the user device;

the acoustic property of current surroundings of the user is determined by the user device; and an information about the determined acoustic property is sent from the user device to the hearing device.

6. The method of claim 4, wherein the audio sample is compared with the original version of the audio content by the user device;

the acoustic property of current surroundings of the user is determined by the user device;

the parameter for modifying the audio signal depending on the determined acoustic property is determined by the user device; and the determined parameter is sent from the user device to the hearing device.

7. The method of claim 1, wherein the original version of the audio content is loaded from a local or remote memory, if the audio sample is determined to comprise the audio content matching the predetermined sound pattern.

8. A hearing system for improving a listening experience of a user wearing a hearing device, the hearing system comprising the hearing device, the hearing device comprising:

at least one sound input component for generating an audio signal;

a sound processing module for modifying the audio signal; and at least one sound output component for outputting the modified audio signal to the user;

the hearing system further comprising:

an audio provision module for providing an audio sample based on the audio signal generated by the sound input component;

an audio recognition module for determining whether the audio sample comprises an audio content matching a predetermined sound pattern indicative of an original version of the audio content by analyzing the audio sample; and an audio comparison module for comparing the audio sample with the original version of the audio content, if the audio sample is determined to comprise the audio content matching the predetermined sound pattern, and for determining at least one acoustic property of current surroundings of the user depending on the comparison;

wherein:

the audio provision module or the audio comparison module is configured for determining at least one parameter for the modification of the audio signal depending on the determined acoustic property;

the audio signal is generated from sound that originates in a listening environment in the current surroundings of the user, the sound not being generated by the hearing system;

the original version of the audio content is used as a calibration signal for calibrating the sound processing module; and the original version of the audio content corresponds to a known music track, a known jingle, a known audio book, a known recurring public announcement, or a known computer generated voice message.

9. The hearing system of claim 8, further comprising a transceiver for loading the original version of the predetermined sound pattern, if the audio sample is determined to comprise said audio content matching the predetermined sound pattern.

10. The hearing system of claim 8, wherein the hearing device comprises the audio recognition module and the audio comparison module.

11. The hearing system of claim 8, further comprising a user device coupled to the hearing device, the user device comprising the audio recognition module and the audio comparison module.

12. The hearing system of claim 8, wherein the audio recognition module is configured to send the audio sample to a remote server for determining whether the audio sample comprises the audio content matching the predetermined sound pattern.

13. A non-transitory computer-readable medium, in which a computer program adapted to carry out the method of claim 1 is stored.

* * * * *